United States Patent
Ueta (10) Patent No.: US 10,366,020 B2
(45) Date of Patent: Jul. 30, 2019

(54) DATA TRANSFER CONTROL DEVICE AND IMAGE FORMING APPARATUS

(71) Applicants: KABUSHIKI KAISHA TOSHIBA, Tokyo (JP); TOSHIBA TEC KABUSHIKI KAISHA, Tokyo (JP)

(72) Inventor: Tsutomu Ueta, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 15/713,100

(22) Filed: Sep. 22, 2017

(65) Prior Publication Data
US 2019/0095366 A1 Mar. 28, 2019

(51) Int. Cl.
*G06F 13/38* (2006.01)
*G06F 13/16* (2006.01)

(52) U.S. Cl.
CPC ...... *G06F 13/1678* (2013.01); *G06F 13/1668* (2013.01); *G06F 13/1684* (2013.01); *G06F 13/1694* (2013.01)

(58) Field of Classification Search
None
See application file for complete search history.

(56) References Cited

FOREIGN PATENT DOCUMENTS

| JP | 2000-267993 A | 9/2000 |
| JP | 2006-277363 A | 10/2006 |
| JP | 2017-010220 A | 1/2017 |

*Primary Examiner* — Cheng Yuan Tseng
(74) *Attorney, Agent, or Firm* — Foley & Lardner LLP (57) ABSTRACT

A data transfer control device includes an acquisition section, an analysis section, a band detection section, a mask output section and a selection section. The acquisition section acquires data from a plurality of processing sections for transmitting the data with a transmission path. The analysis section analyzes additional information of the data acquired by the acquisition section. The band detection section detects a transmission band of the transmission path based on the additional information. The mask output section outputs a request mask signal for suppressing the transmission of the data based on the transmission band detected by the band detection section and a target band preset on the transmission path. The selection section selects the data transmitted by the processing section based on the request mask signal output by the mask output section.

20 Claims, 5 Drawing Sheets

DATA TRANSFER CONTROL DEVICE AND IMAGE FORMING APPARATUS

FIELD

Embodiments described herein relate generally to a data transfer control device and an image forming apparatus.

BACKGROUND

In a copying device, it is required to execute a data processing such as a scanning or printing at a certain rate in accordance with a processing speed of an external device such as a DF and a print engine. Conventionally, there is known a technology which controls priority of data and keeps a transmission band of a common bus line in a predetermined band based on a data amount of a data part of transmission data transmitted via the common bus line.

However, in the conventional technology, there is a case in which it is difficult to keep the transmission band of the common bus line in the predetermined band without considering the data amount of a head part of the transmission data.

DETAILED DESCRIPTION

In accordance with an embodiment, a data transfer control device comprises an acquisition section, an analysis section, a band detection section, a mask output section and a selection section. The acquisition section acquires data from a plural of processing sections that transmit the data with a transmission path. The analysis section analyzes additional information of the data acquired by the acquisition section. The band detection section detects a transmission band of the transmission path based on the additional information. The mask output section outputs a request mask signal for suppressing the transmission of the data based on the transmission band detected by the band detection section and a target band preset on the transmission path. The selection section selects the data transmitted by the processing section based on the request mask signal output by the mask output section and the request signal.

Hereinafter, a data transfer control device of an embodiment is described with reference to the accompanying drawings.

Figure 1:
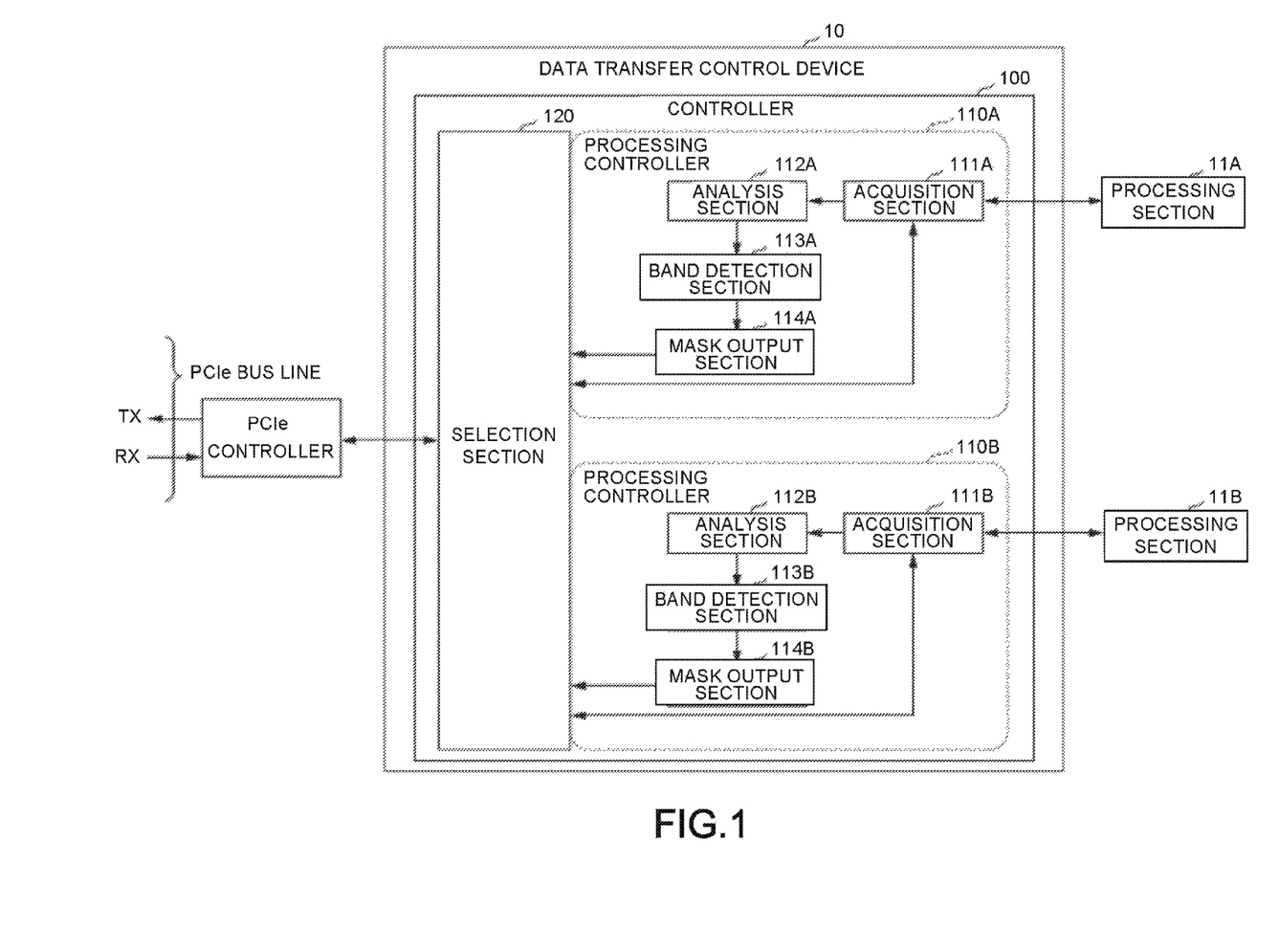
FIG. 1 is a diagram illustrating an example of an arrangement of a data transfer control device 10 according to an embodiment.

FIG. 1 is a diagram illustrating an example of an arrangement of a data transfer control device 10 according to the present embodiment. The data transfer control device 10 is connected with a processing section 11. The processing section 11 transmits data with a common bus line. In an example of the present embodiment, a processing section 11A and a processing section 11B perform data transmission using the common bus line. In the following description, if not distinguished between the processing section 11A and the processing section 11B, they are generically referred to as the processing section 11. The data transfer control device 10 controls the data transmitted by the processing section 11 in such a manner that a transmission band of the common bus line becomes a predetermined band (hereinafter, referred to as a target band). The data transfer control device 10 selects, for example, the data transmitted by the processing section 11 based on the transmission band of the common bus line. The data transfer control device 10 supplies the selected data to a controller controlling the operation of the common bus line.

In the example of the present embodiment, the case in which the data transmitted to the common bus line is transferred to a serial bus line is described. The common bus line and the serial bus line are connected via the controller controlling the operation of the serial bus line. The serial bus line is, for example, a PCIe (Peripheral Component Interconnect Express) bus line. A controller that controls the operation of the PCIe bus line is a PCIe controller. The PCIe controller transfers the data transmitted by the common bus line to the PCIe bus line.

A specific arrangement of the data transfer control device 10 is described below.

The data transfer control device 10 includes a controller 100. The function of the controller 100 is realized by, for example, executing a program stored in a storage section (not shown) by a processor such as a CPU (Central Processing Unit). These functional sections may be realized by hardware such as LSI (Large Scale Integration), ASIC (Application Specific Integrated Circuit), FPGA (Field-Programmable Gate Array), etc., or by cooperation of software and hardware.

The controller 100 includes, for example, a processing controller 110A, a processing controller 110B and a selection section 120 as functional sections thereof. The controller 100 includes processing controllers 110 the number (two in this example) of which correspond to the number of the processing sections 11 connected to the data transfer control device 10. In the following description, the processing controller 110A and the processing controller 110B are collectively referred to as the processing controller 110 if not distinguished from each other. The processing controller 110A and the processing controller 110B have similar arrangements. In the illustrated example, the components included in the processing controller 110A are shown by appending "A" to the end of the symbols and the components included in the processing controller 110B are shown by appending "B" to the end of the symbols. "A" or "B" is omitted if not distinguishing which constitution is included in the processing controller 110.

The processing controller 110 includes an acquisition section 111, an analysis section 112, a band detection section 113, and a mask output section 114.

The acquisition section 111 acquires information (hereinafter, referred to as request information) indicating the transmission by the processing section 11 using the common bus line and data (hereinafter, referred to as transmission data) transmitted using the common bus line. The request information includes, for example, information indicating a processing (for example, reading/writing of a memory) executed by the request, a data size of the transmission data, and the like. The processing section 11 supplies the request information for each transmission data and the transmission data to the acquisition section 111 at the time of executing the transmission with the common bus line. The acquisition section 111 supplies the acquired request information to the analysis section 112. The acquisition section 111 acquires the data from the processing section 11 in response to the selection by the selection section 120. The acquisition section 111 supplies the acquired transmission data to the selection section 120. The selection section 120 is described in detail later. The acquisition section 111 may acquire the request information and the transmission data at the same time. In this case, the acquisition section 111 has a buffer function capable of storing the transmission data and supplies the transmission data stored in a buffer according to the selection by the selection section 120.

The analysis section 112 analyzes the additional information of the transmission data based on the request information acquired by the acquisition section 111. The additional information indicates a data amount at the time the transmission data is transferred to the PCIe bus line. Here, at the time the transmission data is transferred to the PCIe bus line, header information and the data information are serially transmitted to the PCIe bus line. Based on the request information, the analysis section 112 analyzes data amount (hereinafter, referred to as head information amount) of the header information and data amount (hereinafter, referred to as data information amount) of the data information of the transmission data as the additional information.

The band detection section 113 detects the transmission band of the common bus line accompanying the transmission of the transmission data based on the additional information analyzed by the analysis section 112. Specifically, the band detection section 113 detects the transmission band of the common bus line based on the additional information and information on the common bus line (hereinafter, referred to as common bus line information). The common bus line information indicates, for example, a target band, a bus width and time required for one transmission cycle of the common bus line. The target band of the common bus line is preferably a band considering the transmission band of the PCIe bus line so that the PCIe bus line can transmit the data at a constant rate. The common bus line information is stored in advance in the storage section (not shown) of a data transfer control device 10. The transmission band of the common bus line is calculated by dividing, from the sum of the head information amount and the data information amount, a value obtained by multiplying the time of one transmission cycle by the number of transmission cycles generated since the transmission data is transmitted. The band detection section 113 detects the transmission band every one period of the transmission cycle of the common bus line.

The mask output section 114 outputs a signal (hereinafter, referred to as a request mask signal) for suppressing the transmission of the transmission data to the common bus line based on the transmission band and the target band of the common bus line detected by the band detection section 113. Specifically, the mask output section 114 outputs the request mask signal for the transmission data of the processing section 11 if the transmission band detected by the band detection section 113 is equal to or larger than the target band. The mask output section 114 does not output the request mask signal for the transmission data of the processing section 11 if the transmission band detected by the band detection section 113 is smaller than the target band. The mask output section 114 controls the output of the request mask signal every cycle of the transmission cycle of the common bus line, for example. The mask output section 114 outputs the request mask signal and inputs it to the selection section 120.

The request mask signal is input from the mask output section 114 to the selection section 120. The selection section 120 selects the transmission data based on whether the request mask signal is input from the mask output section 114. The selection section 120 selects, for example, the data of the processing section 11 for which the request mask signal is not output as the transmission data.

In an example of the present embodiment, the selection section 120 receives the request mask signals from a mask output section 114A and a mask output section 114B, respectively.

In the following description, the request mask signal output by the mask output section 114A is described as a request mask signal RA, and the request mask signal output by the mask output section 114B is described as a request mask signal RB.

In this example, the selection section 120 selects the transmission data based on whether the request mask signal RA and the request mask signal RB are input. The selection section 120 selects the data of the processing section 11B as the transmission data if only the request mask signal RA is input. The selection section 120 selects the data of the processing section 11A as the transmission data if only the request mask signal RB is input.

The selection section 120 acquires the selected data of the processing section 11 from the acquisition section 111 and transmits it to the common bus line. The transmission data selected by the selection section 120 is transferred to the PCIe bus line.

The operation of the data transfer control device 10 is described in detail below.

Figure 2:
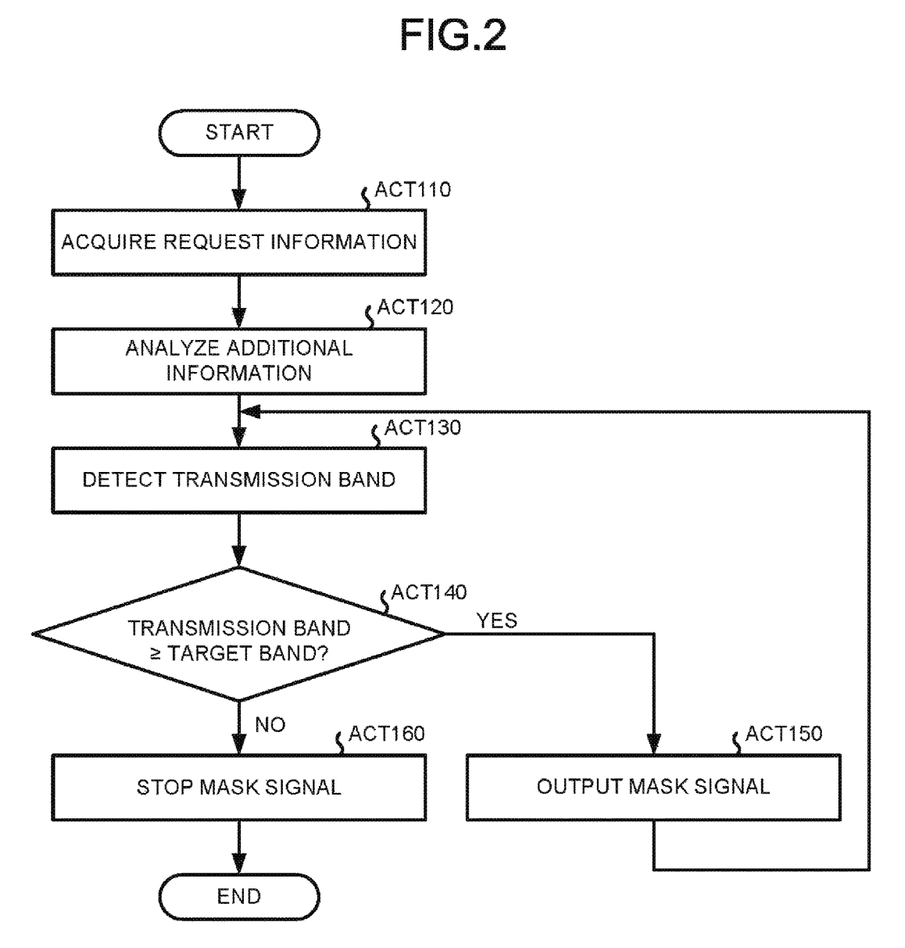
FIG. 2 is a flowchart illustrating an example of the operation of the data transfer control device 10 according to the present embodiment.

FIG. 2 is a flowchart illustrating an example of the operation of the data transfer control device 10 according to the present embodiment.

The acquisition section 111 acquires the request information from the processing section 11 (ACT 110). The analysis section 112 analyzes the additional information based on the request information acquired by the acquisition section 111 (ACT 120). The band detection section 113 detects the transmission band of the common bus line accompanying the transmission of the transmission data based on the additional information analyzed by the analysis section 112 and the common bus line information (ACT 130). The mask output section 114 outputs the request mask signal based on the transmission band detected by the band detection section 113 and the target band. Specifically, if the transmission band detected by the band detection section 113 is equal to or larger than the target band (Yes in ACT 140), the mask output section 114 outputs the request mask signal to the selection section 120 (ACT 150). If the transmission band detected by the band detection section 113 is smaller than the target band (No in ACT 140), the mask output section 114 does not output the request mask signal (ACT 160).

Hereinafter, the operation of the selection section 120 is described in detail.

Figure 3:
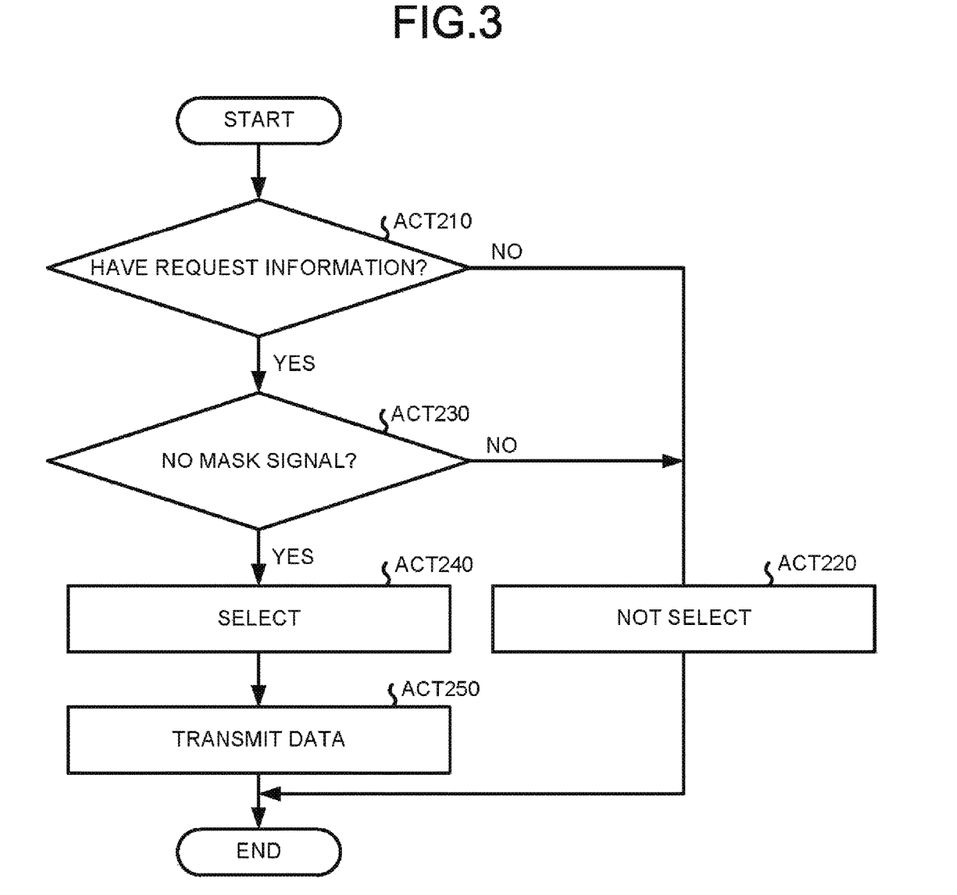
FIG. 3 is a flowchart illustrating an example of the operation of a selection section 120 according to the present embodiment.

FIG. 3 is a flowchart illustrating an example of the operation of the selection section 120 according to the present embodiment.

The selection section 120 does not select the transmission data (ACT 220) if the acquisition section 111 does not acquire the request information (No in ACT 210). The selection section 120 determines whether or not the request mask signal is input for the data of the processing section 11 that supplies the request information (ACT 230) if the acquisition section 111 acquires the request information (Yes in ACT 210). The selection section 120 selects the data as the transmission data (ACT 240) if the request mask signal is not input for the data of the processing section 11 supplying the request information (Yes in ACT 230). The selection section 120 does not select the data as the transmission data (ACT 220) if the request mask signal is input for the data of the processing section 11 supplying the request information (No in ACT 230). The selection section 120 acquires the selected data from the acquisition section 111 and transmits the acquired data to the common bus line (ACT 250).

An example of a specific processing by the data transfer control device 10 is described below.

Figure 4:
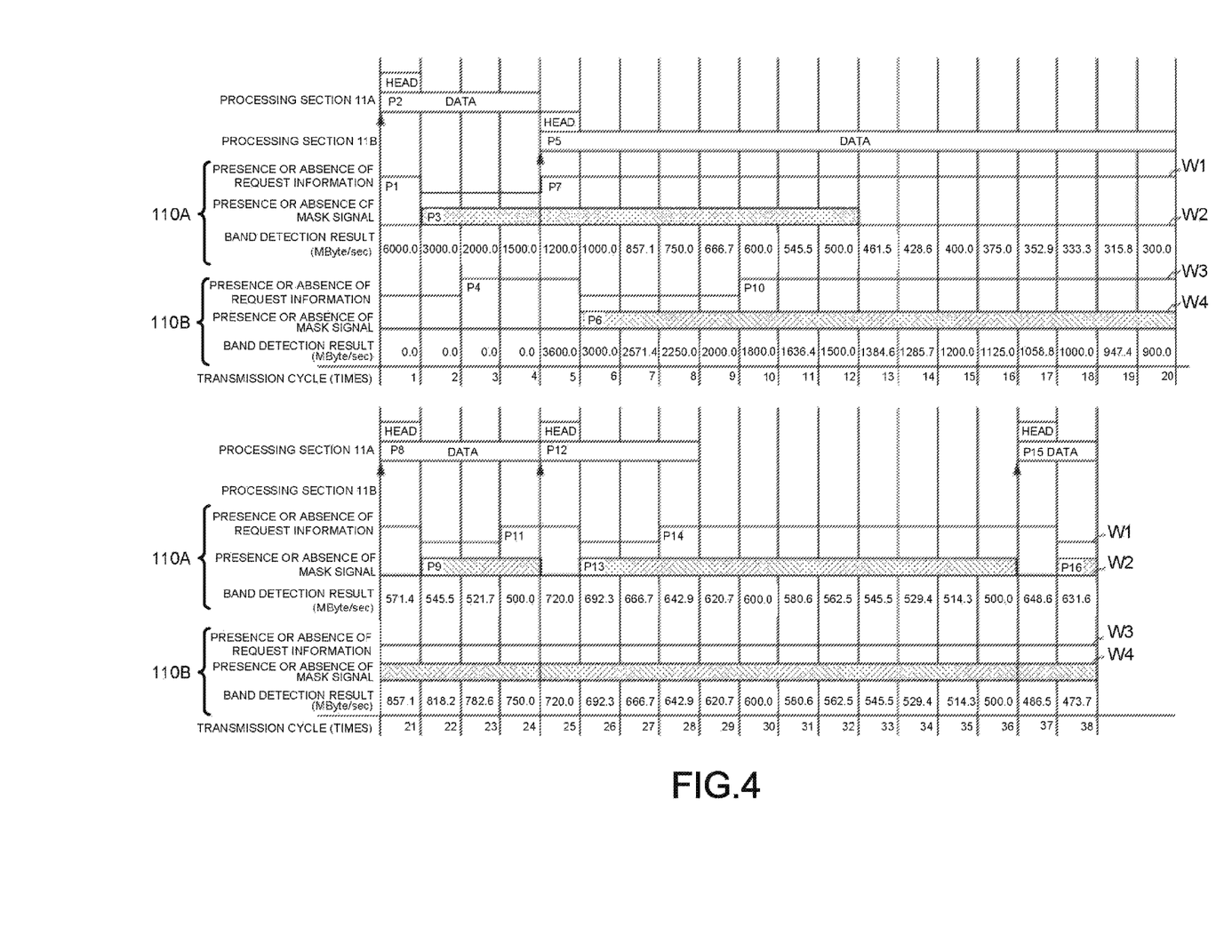
FIG. 4 is a graph illustrating an example of a processing by the data transfer control device 10 according to the present embodiment.

FIG. 4 is a graph illustrating an example of a processing by the data transfer control device 10 according to the present embodiment.

The horizontal axis of FIG. 4 shows the number of transmission cycles counted from a certain time, and waveform W1 to waveform W4 are shown in FIG. 4. The waveform shows whether the acquisition section 111A acquires the request information. For example, the waveform W1 shows a high level if the acquisition section 111A acquires the request information, and shows a low level if the acquisition section 111A does not acquire the request information. If the acquisition section 111A acquires the request information and the transmission data in response to the request information is not transmitted to the common bus line, the waveform W1 keeps the high level. The waveform W2 shows whether the mask output section 114A outputs the request mask signal RA or not. For example, the waveform W2 shows a high level if the mask output section 111A outputs the request mask signal RA, or shows a low level if the mask output section 114A does not output the request mask signal RA.

The waveform W3 shows whether or not the acquisition section 111B acquires the request information. For example, the waveform W3 shows a high level if the acquisition section 111B acquires the request information, and shows a low level if the acquisition section 111B does not acquire the request information. If the acquisition section 111B acquires the request information and the transmission data in response to the request information is not transmitted to the common bus line, the waveform W3 keeps a high level. The waveform W4 shows whether or not the mask output section 114B outputs the request mask signal RB. For example, the waveform W4 shows a high level if the mask output section 114B outputs the request mask signal RB, and shows a low level if the mask output section 114B does not output the request mask signal RB. In FIG. 4, the transmission bands detected by a band detection section 113A and a band detection section 113B are shown each cycle of the transmission cycle.

In the example shown in FIG. 4, the head information amount of the data transmitted by the processing section 11A is 16 Bytes and the data information amount thereof is 32 Bytes. The head information amount of the data transmitted by the processing section 11B is 16 Bytes and the data information amount thereof is 128 Bytes. The target band of the common bus line accompanying the transmission of the transmission data of the processing section 11A is 500 MB/sec. The target band of the common bus line accompanying the transmission of the transmission data of the processing section 11B is 250 MB/sec. The bus width of the common bus line is 8 Bytes, and the time required for one transmission cycle is 8 nsec.

First, in the first transmission cycle shown in FIG. 4, the acquisition section 111A acquires the request information from the processing section 11A (point P1 shown in FIG. 4). In the selection section 120, the request mask signal RA is not input in the first transmission cycle. Therefore, the selection section 120 selects the data corresponding to the request information acquired by the acquisition section 111A and transmits it as the transmission data to the common bus line. In the first transmission cycle, the acquisition section 111A transmits the transmission data acquired in the first transmission cycle to the common bus line (point P2 in FIG. 4).

The band detection section 113A detects the transmission band of the common bus line along with the transmission of the transmission data in the first transmission cycle. Here, the transmission band detected by the band detection section 113A shows a value equal to or larger than that of the target band (500 MB/sec) during the first to twelfth transmission cycles Therefore, the mask output section 114A outputs the request mask signal RA during the second to twelfth transmission cycles (point P3 shown in FIG. 4).

Next, in the third transmission cycle, the acquisition section 111B acquires the request information from the processing section 11B (point P4 shown in FIG. 4). In the selection section 120, the request mask signal RB is not input in the third transmission cycle. Therefore, the selection section 120 selects the data corresponding to the request information acquired by the acquisition section 111B and transmits it as the transmission data to the common bus line. Here, the transmission data transmitted by the processing section 11A in the first transmission cycle is transmitted to the common bus line during the first to fourth transmission cycles. Therefore, in the fifth transmission cycle, the common bus line transmits the transmission data corresponding to the request information acquired by the acquisition section 111B in the third transmission cycle (point P5 shown in FIG. 4).

The band detection section 113B detects the transmission band of the common bus line along with the transmission of the transmission data in the fifth transmission cycle. Here, the transmission band detected by the band detection section 113B shows a value equal to or larger than that of the target band (250 MB/sec) after the fifth transmission cycle. Therefore, the mask output section 114B outputs the request mask signal RB after the sixth transmission cycle (point P6 shown in FIG. 4).

In the fifth transmission cycle, the acquisition section 111A acquires the request information from the processing section 11A (point P7 shown in FIG. 4). As described above, the request mask signal RA is input to the selection section 120 in the second to twelfth transmission cycles. Therefore, the selection section 120 does not transmit the data of the processing section 11A to the common bus line during the second to twelfth transmission cycles. In the thirteenth transmission cycle, the selection section 120 transmits to the common bus line the data corresponding to the request information acquired by the acquisition section 111A in the fifth transmission cycle. The transmission data transmitted by the processing section 11B is transmitted to the common bus line during the fifth to twentieth transmission cycles. Therefore, in the transmission cycle for the 21st time, the common bus line transmits the transmission data corresponding to the request information acquired by the acquisition section 111A in the fifth transmission cycle (point P8 in FIG. 4).

The band detection section 113A detects the transmission band of the common bus line along with transmission of the transmission data in the 21st transmission cycle. Here, the transmission band detected by the band detection section 113A shows a value equal to or greater than that of the target band during the 21st to 24th transmission cycles. Therefore, the mask output section 114A outputs the request mask signal RA during the 22nd to 24th transmission cycles (point P9 shown in FIG. 4).

In the tenth transmission cycle, the acquisition section 111B acquires the request information from the processing section 11B (point P10 shown in FIG. 4). As described above, the request mask signal RB is input to the selection section 120 after the sixth transmission cycle. Therefore, the selection section 120 does not transmit the data of the processing section 11B to the common bus line.

In the 24th transmission cycle, the acquisition section 111A acquires the request information from the processing section 11A (point P11 shown in FIG. 4). As described above, the request mask signal RA is input to the selection section 120 in the 22nd to 24th transmission cycles. Therefore, the selection section 120 does not transmit the data of the processing section 11A to the common bus line during the 22nd to 24th transmission cycles. The selection section 120 transmits to the common bus line the data corresponding to the request information acquired by the acquisition section 111A in the 24th transmission cycle in the 25th transmission cycle. In the 25th transmission cycle, the common bus line transmits the transmission data corresponding to the request information acquired by the acquisition section 111A in the 24th transmission cycle (point P12 shown in FIG. 4).

The band detection section 113A detects the transmission band of the common bus line as it transmits the transmission data in the 25th transmission cycle. Here, the transmission band detected by the band detection section 113A shows a value equal to or greater than that of the target band during the 25th to 36th transmission cycle. Therefore, the mask output section 114A outputs the request mask signal RA during the 26th to 36th transmission cycles (point P13 shown in FIG. 4).

In the 28th transmission cycle, the acquisition section 111A acquires the request information from the processing section 11A (point P14 shown in FIG. 4). As described above, the request mask signal RA is input to the selection section 120 in the 26th to 35th transmission cycles. Therefore, the selection section 120 does not transmit the data of the processing section 11A to the common bus line during the 26th to 36th transmission cycles. The selection section 120 transmits to the common bus line the transmission data corresponding to the request information acquired by the acquisition section 111A in the transmission cycle of the 28th transmission section in the 37th transmission cycle. The common bus line transmits the transmission data acquired by the acquisition section 111A in the 28th transmission cycle in the 37th transmission cycle (point P15 shown in FIG. 4).

The band detection section 113A detects the transmission band of the common bus line along with the transmission of the transmission data in the 37th transmission cycle. Here, the transmission band detected by the band detection section 113A shows a value equal to or greater than that of the target band since the 37th transmission cycle. Therefore, the mask output section 114A outputs the request mask signal RA after the 38th transmission cycle (point P16 shown in FIG. 4).

As described above, the data transfer control device 10 of the present embodiment includes the acquisition section 111, the analysis section 112, the band detection section 113, and the mask output section 114. The acquisition section 111 acquires the request information from a plurality of the processing sections 11 transmitting the transmission data using the common bus line. The analysis section 112 analyzes the additional information based on the request information acquired by the acquisition section 111. The band detection section 113 detects the transmission band of the common bus line based on the additional information analyzed by the analysis section 112. The mask output section 114 outputs the request mask signal based on the transmission band detected by the band detection section 113 and the target band preset in the common bus line. The selection section 120 selects the transmission data to be transmitted to the common bus line among the transmission data based on the request mask signal.

Therefore, according to the data transfer control device 10 of the present embodiment, it is possible to control the transmission data transmitted to the common bus line according to the request mask signal and keep the transmission band of the common bus line in the target band.

The analysis section 112 included in the data transfer control device 10 of the present embodiment analyzes the head information amount and the data information amount of the transmission data as the additional information. The band detection section 113 included in the data transfer control device 10 of the present embodiment detects the transmission band based on the head information amount and the data information amount analyzed by the analysis section 112.

Therefore, according to the data transfer control device 10 of the present embodiment, not only the data information amount of the transmission data but also the head information amount is considered, the transmission band of the common bus line can be kept in the target band.

The band detection section 113 included in the data transfer control device 10 of the present embodiment detects the transmission band for each transmission cycle of the common bus line.

Therefore, according to the data transfer control device 10 of the present embodiment, the output of the request mask signal can be controlled according to the transmission cycle of the common bus line.

The mask output section 114 included in the data transfer control device 10 of the present embodiment outputs the request mask signal if the transmission band detected by the band detection section 113 is equal to or larger than the target band. The mask output section 114 of the data transfer control device 10 of the present embodiment does not output the request mask signal if the transmission data is smaller than the target band.

Therefore, the data transfer control device 10 of the present embodiment does not transmit the transmission data to the common bus line if the transmission band of the common bus line is equal to or greater than the target band. As a result, the data transfer control device 10 of the present embodiment can suppress the transmission exceeding the target band. The data transfer control device 10 of the present embodiment transmits the transmission data to the common bus line if the transmission band of the common bus line is smaller than the target band. As a result, the data transfer control device 10 of the present embodiment can control the transmission band to approach the target band and keep the transmission band in the target band.

The selection section 120 included in the data transfer control device 10 of the present embodiment selects the transmission band for which the transmission to the common bus line is not suppressed by the request mask signal.

Therefore, according to the data transfer control device 10 of the present embodiment, if the transmission band exceeds the target band, the transmission of the transmission data to the common bus line can be suppressed.

In the data transfer control device 10 of the present embodiment, the analysis section 112 and the band detection section 113 are provided corresponding to the processing section 11 connected to the data transfer control device 10.

Therefore, according to the data transfer control device 10 of the present embodiment, the target band corresponding to the connected processing section 11 can be set and the transmission band can be controlled.

In the above description, at least one of the request mask signal RA and the request mask signal RB is input to the selection section 120, but the present invention is not limited thereto. The selection section 120 may select the transmission data based on the data information amount of the transmission data, for example. The selection section 120 may select the transmission data having the small head information amount or the small data information amount if the request mask signal is not input. In this case, the data transfer control device 10 can perform the transmission with small change in the transmission band accompanying the transmission of the transmission data, and keep the transmission band in the target band. The selection section 120 may select the transmission data having the large head information amount or the large data information amount if the request mask signal is not input. In this case, the data transfer control device 10 can efficiently transmit the transmission data with a large amount of information during a period in which the transmission data suppression is not performed according to the request mask signal.

The selection section 120 may select the transmission data with the small head information amount and the large data information amount, or may transmit the transmission data having the large head information amount and the small data information amount.

A data transfer control device 10 of a modification is described below with reference to the drawing.

Figure 5:
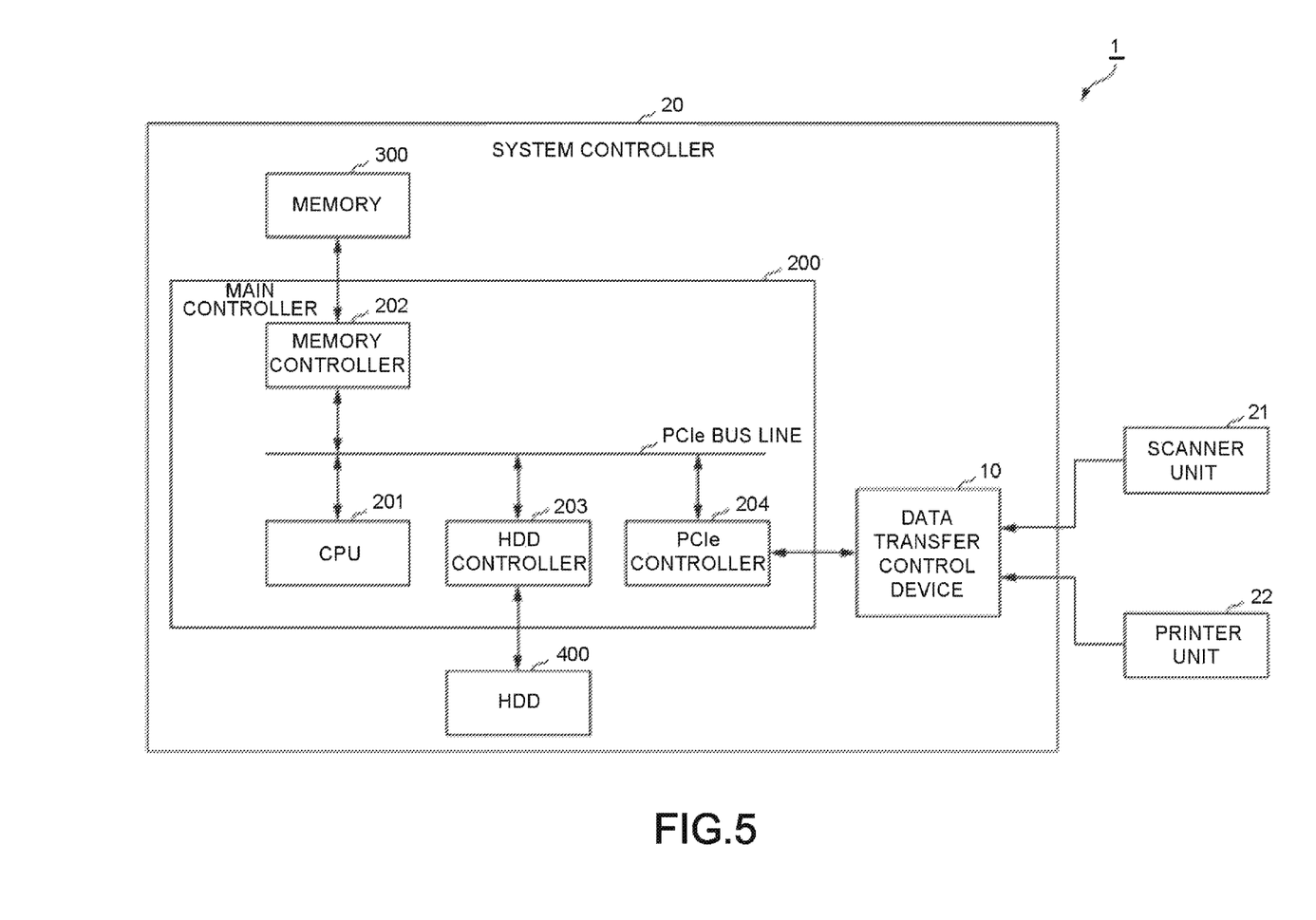
FIG. 5 is a diagram illustrating an example of an arrangement of an image forming apparatus 1 according to a modification.

FIG. 5 is a diagram illustrating an example of an arrangement of an image forming apparatus 1 according to the modification.

As shown in FIG. 5, in the modification, the data transfer control device 10 is provided in the image forming apparatus 1. The data transfer control device 10 controls the transmission data transmitted by the processing section in such a manner that the transmission band of the common bus line of the image forming apparatus 1 becomes the target band.

The image forming apparatus 1 includes, for example, a system controller 20, a scanner unit 21, and a printer unit 22. The image forming apparatus 1 may include a display section, an operation section, a communication section, a fax unit, and the like (not shown). The system controller 20 controls operations of the scanner section 21 and the printer unit 22.

The system controller 20 includes, for example, the data transfer control device 10, a main controller 200, a memory 300, and an HDD (Hard Disk Drive) 400.

The scanner unit 21 and the printer unit 22 are connected to the data transfer control device 10 via the common bus line. The data transfer control device 10 and the main controller 200 are connected via the common bus line.

The memory 300 is realized by a flash memory, a RAM (Random Access Memory), a ROM (Read Only Memory), or the like. In the memory 300, a system program is stored in advance.

The main controller 200 includes, for example, a CPU 201, a memory controller 202, an HDD controller 203, and a PCIe controller 204 as functional sections thereof. The components of the main controller 200 are connected by the PCIe bus line.

The CPU 201 controls the operation of each functional section of the main controller 200. The memory controller 202 controls reading and writing operation of the information stored in the memory 300 under the control of the CPU 201. The HDD controller 203 controls the reading and writing operation of the information stored in the HDD 400 under the control of the CPU 201. The PCIe controller 204 controls the transmission of data executed using the PCIe bus line. The PCIe controller 204 transfers the data transmitted by the common bus line to the PCIe bus line.

The image information read by the scanner unit 21 is transmitted via the common bus line to be stored in the HDD 400. The image information stored in the HDD 400 is transmitted via the common bus line to be printed by the printer unit 22.

It is preferable that the information handled in the scanner unit 21 and the printer unit 22 is transmitted with the transmission band being kept in the predetermined band. The data transfer control device 10 controls the transmission using the common bus line of information (transmission data) handled in the scanner unit 21 and the printer unit 22 by the above-described constitution.

As described above, the data transfer control device 10 of the modification is provided in the image forming apparatus 1.

Therefore, the image forming apparatus 1 can keep the transmission band in the target band if the transmission data relating to the scanning and printing of the image forming apparatus 1 is transmitted.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A data transfer control device, comprising:
    an acquisition section configured to acquire data from a plurality of processing sections for transmitting the data with a transmission path;
    an analysis section configured to analyze additional information of the data acquired by the acquisition section;
    a band detection section configured to detect a transmission band of the transmission path based on the additional information;
    a mask output section configured to output a request mask signal for suppressing the transmission of the data based on the transmission band detected by the band detection section and a target band preset on the transmission path; and
    a selection section configured to select the data transmitted on the transmission path among the data based on the request mask signal output by the mask output section.

2. The data transfer control device according to claim 1, wherein the analysis section is configured to analyze head size information of the data and data size information of the data as the additional information, and the band detection section is configured to detect the transmission band based on the head size information and the data size information.

3. The data transfer control device according to claim 1, wherein the band detection section is configured to detect the transmission band each cycle the data is transmitted.

4. The data transfer control device according to claim 1, wherein the mask output section is configured to output the request mask signal when the transmission band detected by the band detection section is equal to or larger than the target band, and to not output the request mask signal when the transmission band detected by the band detection section is smaller than the target band.

5. The data transfer control device according to claim 1, wherein the selection section is configured to select the data the transmission of which is not suppressed according to the request mask signal.

6. The data transfer control device according to claim 1, wherein the analysis section and the band detection section are arranged to correspond to the processing section.

7. The data transfer control device according to claim 1, wherein the processing section includes an external device processing section of an external device which is connected to the data transfer control device to transmit the data via the transmission path and an internal processing section of an internal device which is arranged inside the data transfer control device to transmit the data via the transmission path.

8. The data transfer control device according to claim 1, wherein the selection section is configured to select the data based on data size information of the data when the mask output section does not output the request mask signal.

9. The data transfer control device according to claim 1, wherein the selection section is configured to select the data based on head size information of the data when the mask output section does not output the request mask signal.

10. The data transfer control device according to claim 1, wherein the transmission band is based on a sum of head information amount of the data and a data information amount of the data.

11. An image forming apparatus, comprising a data transfer control device, wherein the data transfer control device comprises:

an acquisition section configured to acquire data from a plurality of processing sections for transmitting the data with a transmission path;

an analysis section configured to analyze additional information of the data acquired by the acquisition section;

a band detection section configured to detect a transmission band of the transmission path based on the additional information;

a mask output section configured to output a request mask signal for suppressing the transmission of the data based on the transmission band detected by the band detection section and a target band preset on the transmission path; and a selection section configured to select the data transmitted on the transmission path among the data based on the request mask signal output by the mask output section.

12. The image forming apparatus according to claim 11, wherein the analysis section is configured to analyze head size information of the data and data size information of the data as the additional information, and the band detection section is configured to detect the transmission band based on the head size information and the data size information.

13. The image forming apparatus according to claim 11, wherein the band detection section is configured to detect the transmission band each cycle the data is transmitted.

14. The image forming apparatus according to claim 11, wherein the mask output section is configured to output the request mask signal when the transmission band detected by the band detection section is equal to or larger than the target band, and to not output the request mask signal when the transmission band detected by the band detection section is smaller than the target band.

15. The image forming apparatus according to claim 11, wherein the selection section is configured to select the data the transmission of which is not suppressed according to the request mask signal.

16. A method of data transfer, comprising:

acquiring data from a plurality of processing sections for transmitting the data with a transmission path;

analyzing additional information of the acquired data;

detecting a transmission band of the transmission path based on the additional information;

outputting a request mask signal for suppressing the transmission of the data based on the detected transmission band and a target band preset on the transmission path; and selecting the data transmitted on the transmission path among the data based on the output request mask signal.

17. The method of data transfer according to claim 16, wherein the analyzing comprises analyzing head size information of the data and data size information of the data as the additional information, and the detecting comprises detecting the transmission band based on the head size information and the data size information.

18. The method of data transfer according to claim 16, wherein the detecting comprises detecting the transmission band each cycle the data is transmitted.

19. The method of data transfer according to claim 16, wherein the outputting the request mask signal comprises outputting the request mask signal when the detected transmission band is equal to or larger than the target band, and not outputting the request mask signal when the detected transmission band is smaller than the target band.

20. The method of data transfer according to claim 16, wherein the selecting comprises selecting the data the transmission of which is not suppressed according to the request mask signal.

\* \* \* \* \*